Figure 1:
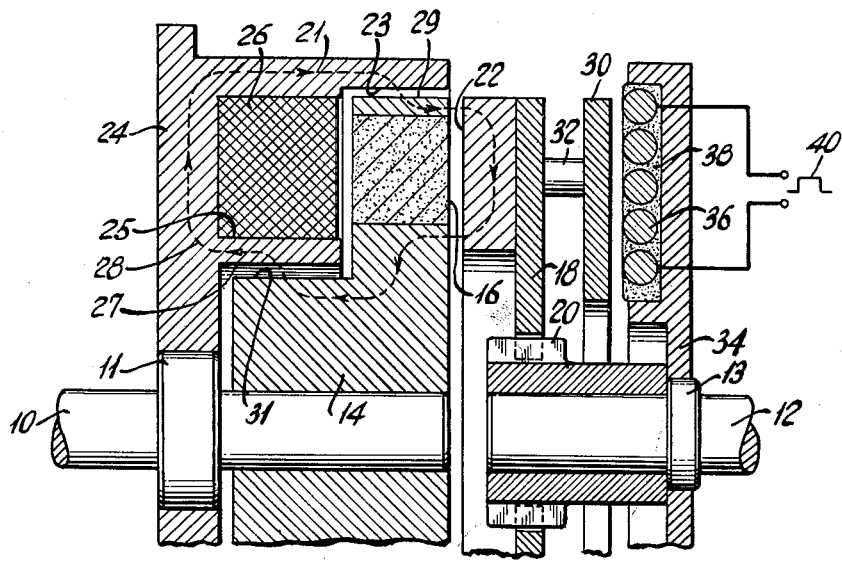

July 20, 1965    G. E. COMSTOCK 3RD    3,195,703
VERY FAST ACTING ELECTROMAGNETIC FRICTION CLUTCH-BRAKE DRIVE
Filed May 17, 1963

INVENTOR.
GEORGE E. COMSTOCK, 3d
BY
Douglas M. Clarkson
ATTORNEY

United States Patent Office 3,195,703
Patented July 20, 1965

3,195,703
VERY FAST ACTING ELECTROMAGNETIC
FRICTION CLUTCH-BRAKE DRIVE
George E. Comstock 3d, Huntington, N.Y., assignor to
Potter Instrument Company, Inc., Plainview, N.Y., a
corporation of New York
Filed May 17, 1963, Ser. No. 281,093
7 Claims. (Cl. 192—84)

This invention, generally, relates to electromagnetically actuated friction clutches and, more particularly, to an improved clutch drive to provide a faster clutch response time.

Electromagnetically actuated clutch mechanisms in which one clutch plate is pulled into engagement with a second clutch plate by the action of a magnetic field established across the interfacial gap are known to the art. Such clutches may be of the type in which one plate is rotated and, upon engagement, will transmit rotational power to the second clutch plate or may be of the type in which one clutch plate is fixedly mounted thereby to brake rotation of the second clutch plate upon actuation.

Since the operation of both the clutch and brake is identical except for the plate mounting, in this application the word "clutch" is meant to apply to both types of structures.

For many reasons, including compatibility with electrical control equipment, it has been desirable to utilize electromagnetically actuated friction clutches for such uses as driving capstans on magnetic tape drives. However, in most uses of such magnetic tape, relatively high tape speeds are required. Since the clutches known to the art are relatively slow (having actuation times in the order of 5 milliseconds), they cannot be utilized in most of such uses due to the excessive tape waste until tape speed has stabilized and information transfer can be accomplished.

The time lag in conventional clutches is inherent in the materials and magnetic circuitry of such clutches. In the normal types of clutches, a clutch rotor is driven rotatably. An armature disc which constitutes the other clutch plate is mounted on a splined output shaft so that it can move axially therealong while being keyed positively to the shaft in the rotational sense.

An actuating coil is provided to establish a magnetic flux, the path of which passes through both clutch plates resulting in an attraction force moving the clutch armature into engagement with the rotor. The attraction force, of course, is dependent upon many factors including the flux density of the established magnetic flux.

However, since the commonly used ferromagnetic materials, such as iron and steel, exhibit magnetic saturation at flux densities of the order of 16,000 gauss, a limitation is inherent in the maximum attraction force that can be developed. Thus, the actuating force is limited to about 100 to 200 pounds per square inch of active air gap normal to the duration of motion because of saturation of the materials, and an increased magneto-motive force in the coil is of no practical effect.

Therefore, it is one object of this invention to provide an improved electromagnetic friction clutch having an improved response time.

It is a further object of this invention to provide an improved electromagnetic friction clutch in which the magnetic actuation force is augmented by eddy current forces to increase the actuation force of engagement and, thus, reduce the actuation time.

In accordance with these objects, there is provided, in a preferred embodiment of this invention, a clutch having a clutch rotor mounted on an input shaft. The clutch rotor is provided with a clutch face which may carry clutch facing of friction material in a manner known to the art.

A clutch armature is mounted as, for example, by means of a spline to an output shaft which permits axial movement of the armature without relative rotational movement. The clutch armature is mounted parallel with the clutch rotor and is provided with a clutch face to engage the clutch face on the rotor.

A magnetic field core structure is provided to generate magnetic flux which links through a magnetic circuit including both the rotor and armature when its associated winding is energized.

An electrically conductive disc is fixedly secured to the clutch armature in parallel relationship thereto, and a separate coil is mounted parallel to and in close proximity to the conductive disc.

To actuate the clutch, both the magnetic field winding and the coil are energized simultaneously, the magnetic field structure being energized with the normal steady state voltage; the coil, however, being energized with a voltage pulse. The magnetic field winding will generate the normal attraction force, but the pulse-actuated coil will induce an eddy current in the conductive disc which will react with the magnetic field resulting from the pulse excitation to produce an axial force augmenting the normal attraction force of the magnetic circuit.

By providing a pulse with an amplitude and a magnitude which is related to the configuration of the excitation coil and the spacing for the conductive disc, a high force level can be obtained which will extend only during the short period during which the clutch armature is moved axially into engagement with the rotor and accelerated by the frictional engagement therewith to the rotational speed of the clutch rotor.

In this manner, an increase in actuation force and, thus, a decrease in actuation time can be obtained without dissipation of excessive energy within the clutch. Once engaged, the magnetic field alone will hold the clutch in the engaged position. Disengagement forces may be augmented by an eddy current force in like manner provided from a similar pulse coil mounted on the opposite face of the conductive disc.

In use, two clutch assemblies may desirably be used with a common output shaft for reversal of direction. Similarly, brakes may be used on a common output shaft for selective clutching and braking action.

Figure 2:
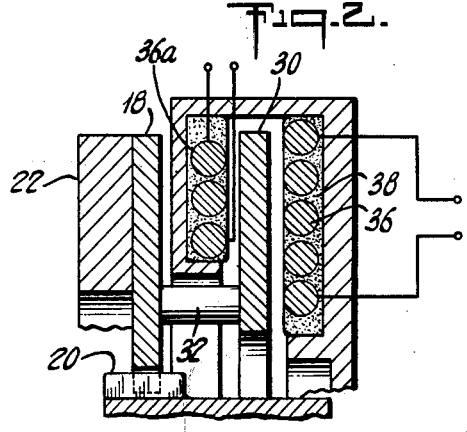

Having briefly described this invention, it will be described in greater detail along with other objects and advantages thereof, in the following detailed specifications which may best be understood by reference to the accompanying drawing, in which:

FIG. 1 is a partially sectioned diagrammatic showing of a clutch constructed in accordance with the present invention, and FIG. 2 is a fragmentary portion of the clutch shown in FIG. 1 with a "de-clutching" coil added.

In FIG. 1, there is shown a clutch having an input shaft 10 supported rotatably in a bearing 11 and an output shaft 12 supported rotatably in a bearing 13. The imput shaft 10 may be driven continuously for installations in which it is desired to selectively drive the output shaft rotatably, or the input shaft 10 may be fixed in position for those applications in which it is desired to selectively brake a rotating output shaft 12.

A rotatable clutch plate or rotor 14 is mounted fixedly on the input shaft 10 and is provided with a clutch face 16 of the usual non-magnetic, frictional material either in an annular ring or in pads spaced about the periphery of the clutch face 16. An annular clutch plate or armature 18 is mounted on a spline 20 secured to the output shaft 12.

The clutch armature 18, therefore, is free to move axially along the output shaft 12, but the armature 18 is fixed rotatably to the shaft 12 to rotate therewith. A clutch face 22 on the armature 18 will engage the clutch face 16 when the armature 18 is moved axially.

A housing 24 of magnetic material is positioned adjacent the clutch rotor 14 to support a winding 26 which, when energized, will establish a magnetic flux 28 linking the clutch rotor 14 and the clutch armature 18 to develop an attraction force to move the clutch armature 18 into frictional engagement with the clutch rotor 14.

The housing 24 is annular with an outer rim flange 21 having an inner, accurately machined, annular surface 23 and with an inner rim flange 25 having an inner, annular surface 27 which is machined and finished accurately also. It now will be seen that outer, annular surfaces 29 and 31 on the rotor 14 may be machined accurately to form highly accurate air gaps with the surfaces 23 and 27. Since these gaps are cylindrical in form, they do not vary appreciably during long periods of use.

To increase the acceleration forces moving the armature into engagement with the rotor, there is provided a conductive annular disc 30 mounted parallel to and spaced from the clutch armature 18 by a plurality of mounting posts 32 spaced about and secured between the clutch armature 18 and the annular conductive disc 30. An air-core, pancake-shaped coil 36, consisting of a plurality of adjacent turns, is mounted in a support 34 by a potting compound 38.

The winding 26 is energized with a steady state electric current to generate a magnetic flux linkage indicated by the numeral 28. Simultaneously, the coil 36 is energized by a current pulse, schematically represented by the numeral 40.

The resultant magnetic field generated by the coil 36 will induce eddy currents in the conductive disc 30, and the interaction between the eddy currents and the magnetic lines of force developed by the coil 36 will generate a force urging the armature 18 into engagement with the rotor 14. Since the force due to the winding 26 now is augmented by the force due to the eddy currents in the disc 30, the time required for movement of the armature 18 into engagement with the rotor 14 and the time required for acceleration of the armature 18 rotationally is decreased.

The magnitude and duration of the force produced by the eddy currents is determined primarily by the amplitude and shape of the current pulse 40, the configuration of the coil 36, the spacing of the coil 36 from the conductive disc 30, and the thickness and conductivity of the disc 30. The force level is many times greater than that available from ferromagnetic phenomena.

Since the magnetic flux 28 provides a steady state engagement of the clutch and since the eddy current force pulse is required only for initial engagement, it is desirable to use a short duration pulse 40 as, for example, in the order of 1 to 2 milliseconds. Thus, the eddy current augmentation exists only during the time that the armature 18 is accelerated into engagement with the rotor 14 and is rotationally accelerated by the frictional engagement therebetween.

For the above-described arrangement to operate as a brake, the rotor 14 merely need be fixedly mounted, against rotation, to selectively brake a rotating output shaft 12.

Although the usual situation is concerned with actuation time, it will be apparent that eddy current augmentation of disengaging forces may be used also, for example, by enlarging the diameter of disc 30 and providing a "drive-off" coil to the left of disc 30 in FIG. 1.

FIG. 2 shows the structure of FIG. 1, with common parts being identified by like reference numerals, but with an auxiliary coil 36a with terminals for connecting a pulse for developing a force tending to move the disc 30 and the clutch face 22 away from the clutch face 16.

This invention may be variously modified and embodied within the scope of the subjoined claims.

What is claimed is:

1. An electromagnetic friction clutch-brake drive comprising,
    a first clutch plate including means for rotational support of the plate,
    a second clutch plate including means for rotational support so that the second clutch plate is axially movable over a predetermined gap for engagement with said first clutch plate,
    means for establishing electromagnetic flux extending across the gap between said first and second plates for moving said second plate into engagement with said first plate, and
    means for establishing a pulsed magnetic field extending to said second clutch plate to induce eddy currents therein to momentarily supplement the electromagnetic flux bringing the first and second clutch plates into engagement.

2. A combination in accordance with claim 1 in which a separate conductive disc is mounted on said second clutch plate.

3. A combination in accordance with claim 2 in which said conductive disc is mounted parallel to and spaced apart from said clutch armature.

4. A combination in accordance with claim 2 in which a coil is wound in a single layer helix positioned parallel to and adjacent said conductive disc.

5. A combination in accordance with claim 1 in which said pulsed field has a duration coextensive with the time for movement of said second plate into engagement with said first plate and rotational acceleration of said second plate.

6. A combination in accordance with claim 1 including second means for establishing a pulsed magnetic field extending across said second clutch plate to urge the clutch plates out of engagement.

7. An electromagnetic friction clutch-brake drive comprising,
    an input shaft including means to support the shaft rotatably,
    a rotor member fixedly supported to the input shaft for rotation therewith and having a surface of frictional material,
    at least two cylindrical surfaces of different diameters formed on the rotor member,
    a housing having a cavity with an electrical winding supported therein and having at least two cylindrical surfaces to receive the two cylindrical surfaces on the rotor member to form two accurately dimensioned air gaps for magnetic lines of force developed by the electrical winding,
    an output shaft including means to support the shaft rotatably,
    an armature having a surface for engagement with the frictional material of the rotor member and including splined means to support the armature on the output shaft for sliding axially and for rotation with the output shaft,
    a disc of electrically conductive material mounted on the armature, and
    an electrical coil means including a support to position the coil in magnetic field applying relationship with the disc for developing eddy currents therein.

References Cited by the Examiner

UNITED STATES PATENTS

| | | | |
|---|---|---|---|
| 363,186 | 5/87 | Thomson | 317—167 X |
| 2,956,658 | 10/60 | Jaeschke | 192—84 |

DON A. WAITE, *Primary Examiner.*

DAVID J. WILLIAMOWSKY, *Examiner.*